(12) United States Patent
Chen et al.

(10) Patent No.: US 8,601,409 B1
(45) Date of Patent: Dec. 3, 2013

(54) COMPRESSION METHOD AND SYSTEM FOR USE WITH MULTI-PATTERNING

(75) Inventors: Huang-Yu Chen, Zhudong Township (TW); Chin-Hsiung Hsu, Guanyin Township (TW); Wen-Hao Chen, Hsin-Chu (TW); Chung-Hsing Wang, Boashan Township (TW)

(73) Assignee: Taiwan Semiconductor Manufacturing Co, Ltd., Hsin-Chu (TW)

( * ) Notice: Subject to any disclaimer, the term of this patent is extended or adjusted under 35 U.S.C. 154(b) by 0 days.

(21) Appl. No.: 13/547,107

(22) Filed: Jul. 12, 2012

(51) Int. Cl.
*G06F 17/50* (2006.01)
(52) U.S. Cl.
USPC .............................. 716/55; 716/54
(58) Field of Classification Search
USPC ..................................... 716/50–55
See application file for complete search history.

(56) References Cited

U.S. PATENT DOCUMENTS

2003/0229880 A1* 12/2003 White et al. .................... 716/19
2006/0236299 A1* 10/2006 Sahouria et al. ............... 716/21
2006/0242619 A1* 10/2006 Pang et al. ..................... 716/19
2009/0068843 A1  3/2009 Yang
2009/0125866 A1  5/2009 Wang et al.

OTHER PUBLICATIONS

"Tachyon™ DDL & Tachyon™ DPT—A Comprehensive Low-K1 Computational Lithography Solution ", 2008, Brion Technologies, Inc., 4 pages.

* cited by examiner

*Primary Examiner* — Binh Tat
(74) *Attorney, Agent, or Firm* — Duane Morris LLP; Steven E. Koffs

(57) ABSTRACT

A method comprises (a) providing an integrated circuit (IC) layout comprising data representing a plurality of circuit patterns to be formed on or in a single layer of an IC by multi-patterning; (b) dividing the plurality of circuit patterns into two or more groups; (c) assigning the circuit patterns within each group to a respective mask to provide mask assignment data, for forming each group of circuit patterns on or in the single layer of the IC; (d) compressing the mask assignment data; and (e) storing the compressed mask assignment data to a non-transitory machine readable storage medium for use by an electronic design automation tool configured for reconstructing the mask assignment data from the compressed data.

21 Claims, 15 Drawing Sheets

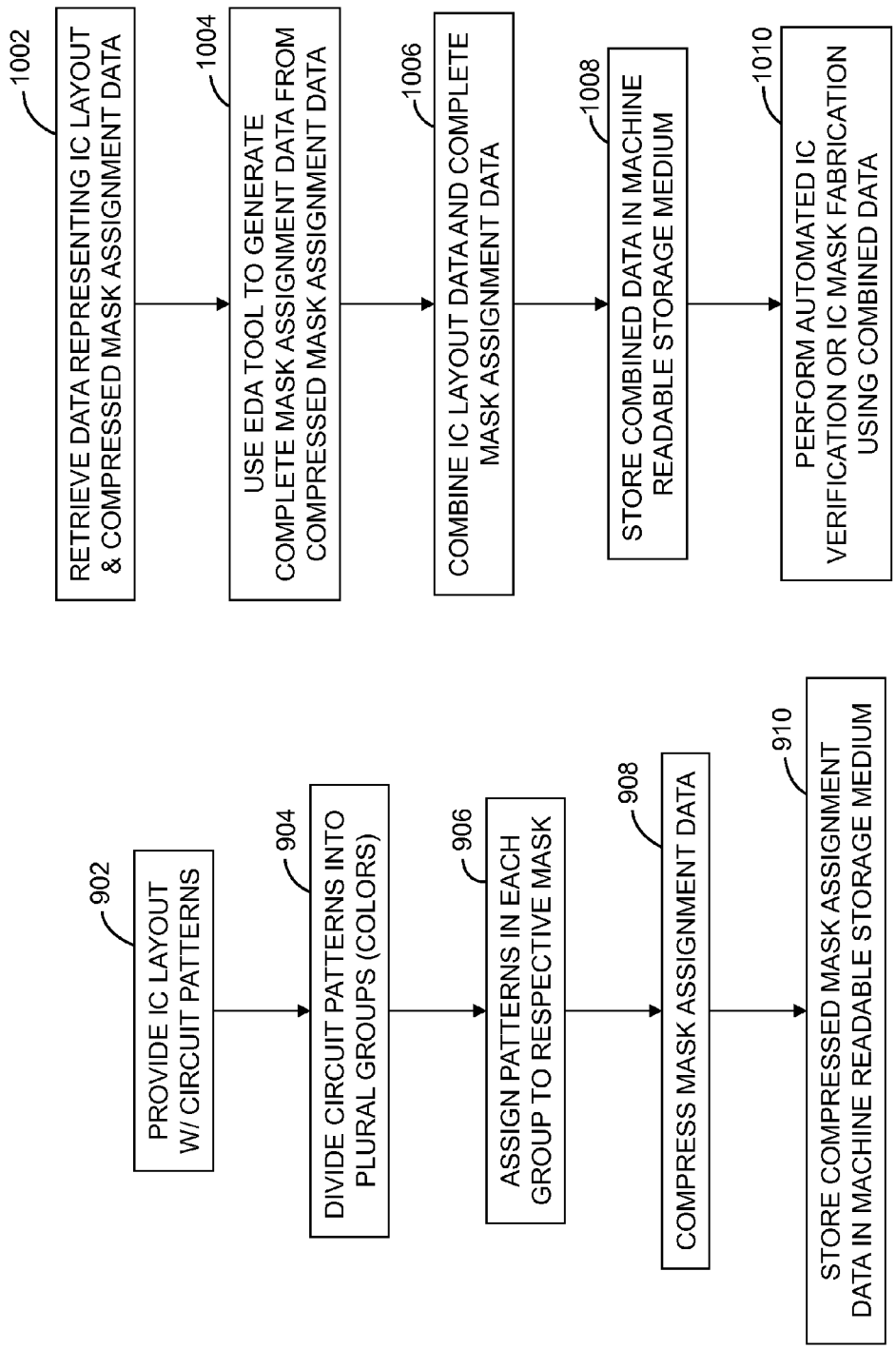

COMPRESSION METHOD AND SYSTEM FOR USE WITH MULTI-PATTERNING

FIELD

This disclosure relates generally to semiconductor fabrication, and more specifically to multi-patterning of semiconductor substrates.

BACKGROUND

In semiconductor fabrication processes, the resolution of a photoresist pattern begins to blur at about 45 nanometer (nm) half pitch. To continue to use fabrication equipment purchased for larger technology nodes, multi-exposure methods have been developed.

Multiple exposure or multi-patterning technology (MPT) involves forming patterns on a single layer of a substrate using two or more different masks in succession. If only two masks are used for patterning a layer, the technique is referred to as double exposure. One form of double exposure is referred to as double patterning technology (DPT). In DPT, first and second masks are used sequentially to pattern the same layer. As long as the patterns within each mask comply with the relevant minimum separation distances for the technology node, the combination of patterns formed using both masks may include smaller separations than the minimum separation distance. MPT allows line segments, and in some cases, vertices (angles) to be formed of a vertical segment and a horizontal segment on the same mask. Thus, MPT provides flexibility and generally allows for significant reduction in overall IC layout.

MPT is a layout splitting method analogous to an M-coloring problem for layout splitting in graph theory, where M is the number of masks used to expose a single layer (and the number of exposures). For example, if two masks are to be used (double patterning, DPT), it is customary to refer to the patterns as being assigned one of two "color types", where the color corresponds to a photomask assignment.

If a given pattern in a given layer cannot be assigned to a different mask from every adjacent pattern in the same layer that is closer than the minimum separation distance, the layout has an MPT conflict. The designer can resolve the MPT conflict without increasing the number of masks by making a change to the layout or inserting a stitch.

BRIEF DESCRIPTION OF THE DRAWINGS

FIG. 9 is a flow chart of a mask assignment data compression method.
FIG. 10 is a flow chart of a mask assignment data decompression method.

DETAILED DESCRIPTION

Figure 1A:
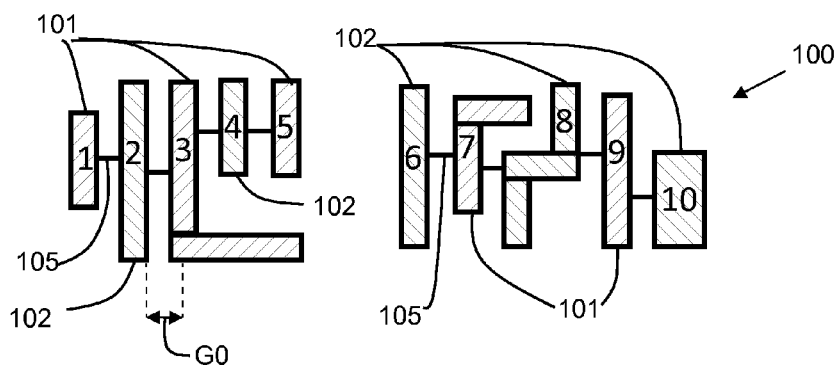
FIG. 1A shows a circuit layout.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

Methods and systems are described below for compressing and decompressing MPT mask assignment data. Once an EDA tool generates an initial layout, the circuit patterns in the layout are decomposed for fabrication using two or more different masks to pattern a single layer. An identification of the mask assignment (the particular photomask on which a particular pattern is to be formed) is added to the layout. For advanced ICs, the size of the layout definition file is very large, and may be on the order of tens of gigabytes. Such large files require large storage resources, and large telecommunications network resources (e.g., when transmitted between designer and foundry, or when transmitted to an off-site storage or backup storage location). The compression methods described below reduce the size of the mask assignment data, and thus reduce demands on storage and communications resources.

Figure 8:
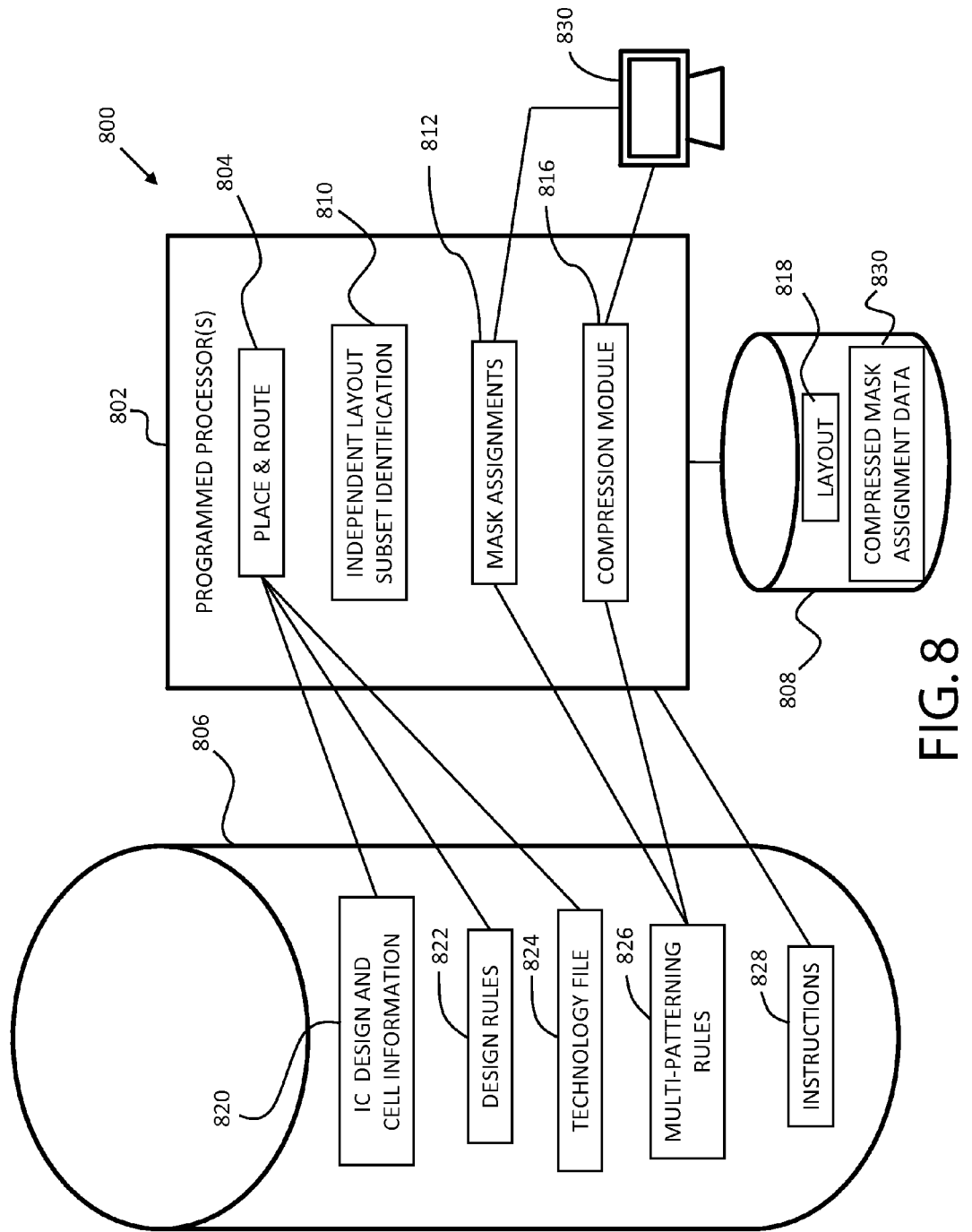
FIG. 8 is a block diagram of an example of a system.

FIG. 8 is a block diagram of an embodiment of a system 800 for performing the method described herein.

System 800 includes at least one non-transitory, computer readable storage medium 808 for storing data representing a layout 818 of a layer of an integrated circuit (IC) comprising a plurality of polygons defining circuit patterns to be divided among a number (N) of photomasks for multi-patterning a single layer of a semiconductor substrate, where N is greater than one. Either the same storage medium 808 or a different storage medium 806 stores data and instructions used by the EDA tool 802. These include, but are not limited to IC design and cell information 820, design rules 822, technology file

824, additional multi-patterning design rules 826, and software program instructions 828.

System 800 includes an electronic design automation ("EDA") tool 802 such as "IC COMPILER"™, sold by Synopsys, Inc. of Mountain View, Calif., which may include a place and route tool 304, such as "ZROUTE"™, also sold by Synopsys. Other EDA tools 802 may be used, such as the "VIRTUOSO" custom design platform or the Cadence "ENCOUNTER"® digital IC design platform may be used, along with the "VIRTUOSO" chip assembly router 804, all sold by Cadence Design Systems, Inc. of San Jose, Calif.

EDA tool 802 is a special purpose computer formed by retrieving stored program instructions from a non-transient computer readable storage medium 806, 808 and executing the instructions on a general purpose processor. Examples of non-transient computer readable storage mediums 806, 808 include, but are not limited to, hard disk drives (HDD), read only memories ("ROMs"), random access memories ("RAMs"), flash memories, or the like. Tangible, non-transient machine readable storage mediums 806, 808 are configured to store data generated by the place and route tool 804.

The router of the place and route tool 804 is capable of receiving an identification of a plurality of cells to be included in an integrated circuit ("IC") or interposer layout, including a netlist 820 containing pairs of cells within the plurality of cells to be connected to each other. Router 804 may be equipped with a set of default design rules 822 and tech file 824. Router 804 generates the custom interconnect routing lines and vias for interconnecting the various devices of the IC.

An independent layout subset identification module 810 determines, for a given polygon, which other polygons are nearer than the threshold minimum separation distance (abbreviated herein as "G0.") Module 810 divides the plurality of circuit patterns into one or more subsets, such that within each subset having two or more circuit patterns, each circuit pattern in that subset is separated by less than a threshold distance from at least one other circuit pattern in that subset. These subsets are identified as independent layout subsets.

Optionally the independent layout subset identification module 810 identifies additional polygons which are spaced further apart from every other pattern by a distance greater than the threshold G0 distance, and may be considered a single-pattern independent layout subset.

The mask assignment module 812 applies the MPT rules 826 and determines the initial assignment of each polygon to one of the photomasks. The module 812 divides the plurality of circuit patterns into two or more groups (one group for each respective photomask). Module 812 assigns the circuit patterns within each group to a respective mask to provide mask assignment data, for forming each group of circuit patterns on or in the single layer of the IC. The default assignment rule assigns the circuit patterns within a given independent layout subset to the masks on a round robin basis. In the case of DPT (two masks), the assignments alternate between the two masks. If any native conflicts are found (groups of polygons that cannot be divided among the available number of photomasks in any combination to avoid having two polygons closer to each other than the G0 distance), the native conflict is reported to the designer, and the conflict is handled using a process described below in the description of FIG. 14. For example, the native conflict can be displayed on the display device 830, and the user prompted to make a modification to the layout to resolve the native conflict (e.g., by re-routing a connection between two pins, or by inserting a stitch).

The EDA tool 802 has a compression module 816 configured for compressing the mask assignment data. In some embodiments, the compression module 816 selects a subset of the mask assignment data for each independent layout subset for inclusion in the compressed mask assignment data 830, and excludes the rest of the mask assignment data. In some embodiments, the compressed mask assignment data 830 includes only the mask assignment of a respective single circuit pattern for each respective subset. The compression module 816 stores the compressed mask assignment data 830 to the storage medium 808 along with the layout, for reconstructing the mask assignment data from the compressed data.

In some embodiments, the compressed mask assignment data 830 includes only the mask assignment of a respective single circuit pattern for each one of the subsets having a closest circuit pattern to a predetermined location assigned to a predetermined one of the masks.

In some embodiments, at least three masks are to be used (triple patterning), and the compression module 816 includes in the compressed mask assignment data 830: the mask assignment of each circuit pattern assigned to the first mask; and the mask assignment of each remaining circuit pattern separated by at least the threshold distance from each other remaining circuit pattern.

In some embodiments, the plurality of circuit patterns includes three or more circuit patterns that cause a multi-patterning conflict; and the compression module 816 includes in the compressed mask assignment data 830 the mask assignments for only two of the three or more circuit patterns. In some embodiments, an MPT conflict in one of the subsets is resolved by inserting a stitch in one of the circuit patterns, with respective portions of each of the at least one circuit pattern on each side of the stitch assigned to a respectively different one of the masks; and the compressed mask assignment data 830 for the one subset only includes, for each circuit pattern having a stitch, a location of the stitch and a mask assignment of a single one of the circuit patterns in that subset or a single one of the portions of the circuit pattern having the stitch.

In some embodiments, the compression module 816 includes in the compressed mask assignment data 830 at least one overlapped circuit pattern separated by at least the threshold distance from each other remaining circuit pattern (an isolated single-pattern subset). The compressed mask assignment data 830 includes the mask assignment of the at least one circuit overlapped pattern (separately assigned to each mask) and only one other single circuit pattern for each respective independent layout subset (comprising patterns separated from each other by less than the threshold distance).

In some embodiments, the compression module 816 identifies points on a layout grid at which each circuit pattern lies; forms a matrix of the layout grid points, including for each point a corresponding mask assignment datum if a circuit pattern lies at that point, or a predetermined value if no circuit pattern lies at that point; and compresses the matrix. A variety of lossless compression programs can be used. For example, the matrix can be compressed into a ZIP format using a program such as WINZIP from Microsoft of Redmond, Wash., or PKZIP, from PKWARE of Milwaukee, Wis.

Block 802 indicates that one or more programmed processors may be included. In some embodiments, the processing load is performed by two or more application programs, each operating on a separate processor. In other embodiments, the processes are all performed using one processor. Similarly, two media 806 and 808 are shown, but the data may be stored in any number of media.

Although FIG. 8 shows an allocation of the various tasks to specific modules, this is only one example. The various tasks may be assigned to different modules to improve performance, or improve the ease of programming.

FIGS. 1A-1C and 9 show one embodiment of a method. FIG. 9 is a flow chart of the method of providing the compressed mask data shown schematically in FIGS. 1A-1C. FIG. 1A shows a layer 100 of an IC, comprising a plurality of circuit patterns 101, 102. Although layer 100 is a back end of line (BEOL) interconnect layer, MPT can be used for FEOL layers, and the method described herein can also be applied to FEOL layers.

At step 902, an integrated circuit (IC) layout is provided, comprising data representing a plurality of circuit patterns 101, 102 to be formed on or in a single layer of an IC by multipatterning. In FIG. 1A (as well as FIGS. 2A, 3A, 4A, 5A, and 6A), lines 105 connecting a pair of adjacent circuit patterns indicate that the spacing between those two patterns is less than a minimum separation for forming both of the patterns clearly on a single IC layer using a single photomask. This minimum separation distance is also referred to herein as the threshold distance, and is abbreviated herein as "G0." In FIG. 1A, the circuit patterns numbered 1 to 5 are in one independent subset, and the circuit patterns numbered 6-10 are in another independent subset. Within each independent subset having two or more circuit patterns, each circuit pattern in that subset is separated by less than the threshold distance G0 from at least one other circuit pattern in that subset. In FIG. 1A, the two patterns numbered 5 and 6 are shown without a connecting line, indicating that they are separated from each other by a distance greater than or equal to the threshold.

Figure 1B:
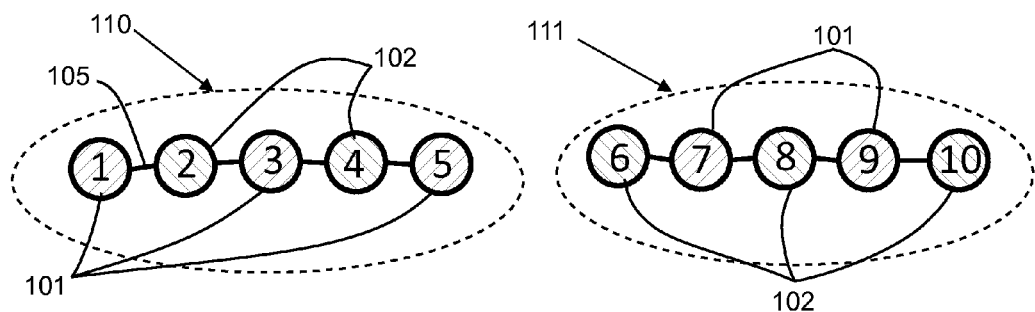
FIG. 1B shows a graph of the layout of FIG. 1A.

FIG. 1B shows a graphical representation of the IC layer 100. The circuit patterns 101, 102 are represented by vertices, and the spacings between adjacent pairs separated by edges 105. The vertices 5 and 6 are unconnected. Thus, the independent layout subsets 110 and 111 can be assigned to the available masks independently of each other.

At step 904 of FIG. 9, the circuit patterns are divided into two or more groups, and each group is assigned to a respective mask to provide mask assignment data, for forming each group of circuit patterns on or in the single layer of the IC. For example, a common default rule for assigning patterns to masks is to follow the patterns in the sequence of their sub-threshold distance (sub-G0) spacings 105, as shown in FIG. 1B, and to assign each successive circuit pattern to a different mask according to a round-robin method. In the case of DPT, using only two photomasks, the round-robin method alternates between the two masks (or colors). FIG. 1B shows the mask assignments based on round-robin assignments. Note that the patterns numbered 5 and 6 could be assigned to the same mask as each other, because of their larger spacing. However, continuing the round robin assignments as shown also helps to balance the areas of circuit patterns assigned to each mask.

At step 908 of FIG. 9, the mask assignment data are compressed. Various lossless compression techniques are described in greater detail below. In some embodiments, only mask assignment data of certain circuit patterns are expressly included in the compressed mask assignment data 830, and mask assignment data of other circuit patterns are excluded from the compressed mask assignment data. In other embodiments, the mask assignment data for all of the circuit patterns are described in a matrix, and the matrix is compressed using a lossless compression algorithm.

At step 910, the compressed mask assignment data 830 is stored to a non-transitory machine readable storage medium for use by an electronic design automation tool configured for reconstructing the mask assignment data from the compressed data.

FIG. 10 is a flow chart of an embodiment of a method for reconstructing a complete set of mask assignment data from the compressed mask assignment data 830.

At step 1002, data are retrieved representing an integrated circuit (IC) layout and compressed mask assignment data 830 from a non-transitory machine readable storage medium.

At step 1004, an electronic design automation (EDA) tool is used to generate a complete set of mask assignment data from the compressed mask assignment data 830 and the IC layout. The method of regenerating the complete mask assignment data is discussed below along with the examples.

At step 1006, the layout data and the complete set of mask assignment data are combined.

At step 1008, the combined data are stored in a non-transitory machine readable storage medium.

At step 1010, an automated IC verification or IC mask fabrication process is performed using the combined data.

Figure 1C:
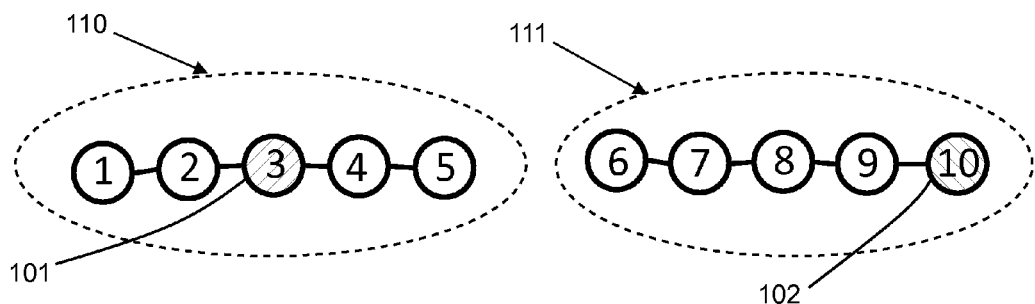
FIG. 1C shows a representation of compressed mask assignment data for the layout of FIG. 1A.
Figure 11:
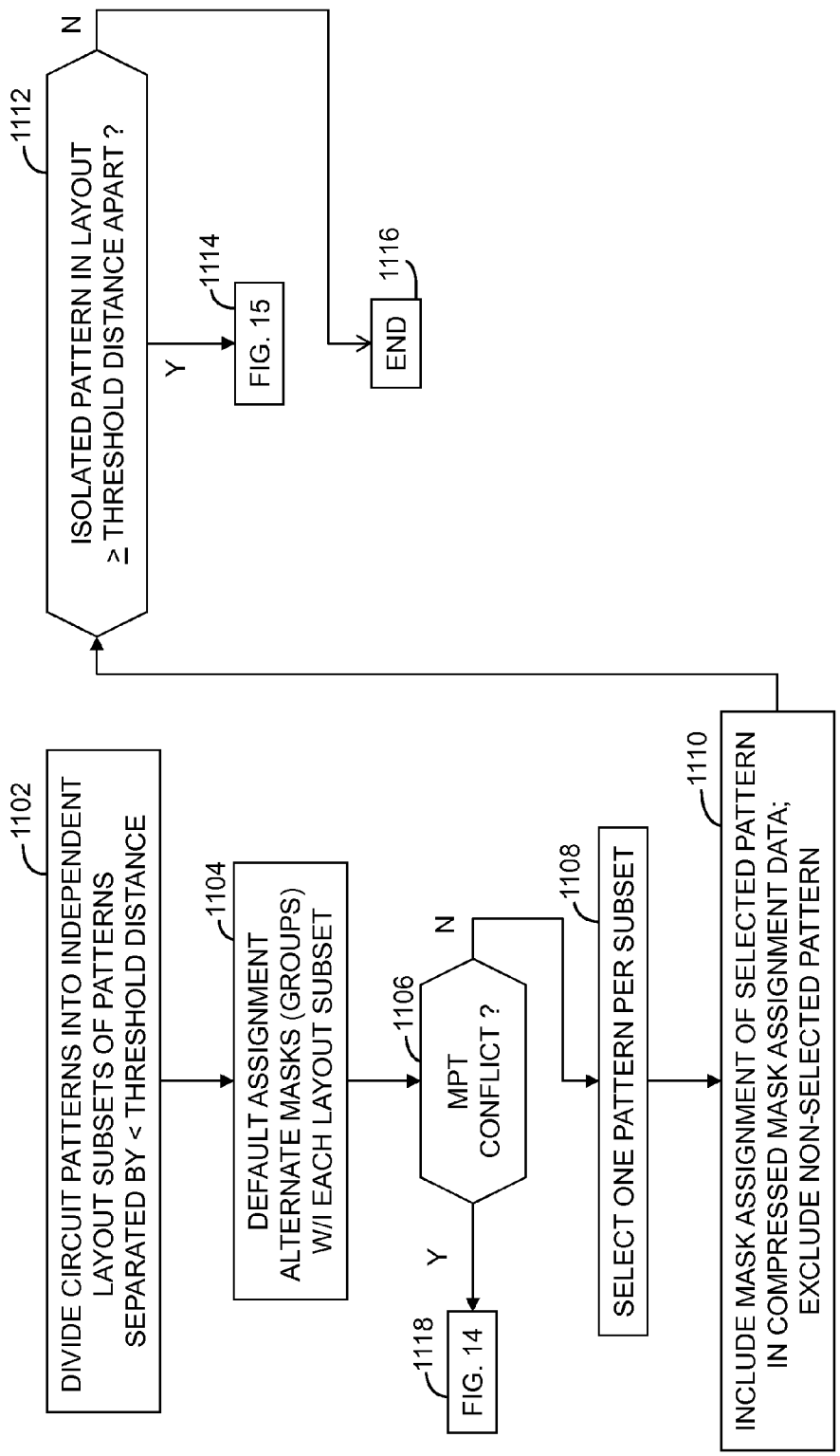
FIG. 11 is a flow chart of the mask assignment data compression algorithm.

Reference is now made to FIG. 11 and FIGS. 1B and 1C.

FIG. 11 is a flow chart of a basic compression process performed by the compression module 816 (FIG. 8). This process receives the complete mask assignment data of FIG. 1B and outputs the compressed mask assignment data of FIG. 1C.

At step 1102 of FIG. 11, the plurality of circuit patterns are divided into one or more independent layout subsets 110, 111, such that within each subset having two or more circuit patterns, each circuit pattern in that subset is separated by less than the threshold distance G0 from at least one other circuit pattern in that subset.

At step 1104, within each subset 110, 111, the default mask assignments alternate between the two masks (groups).

Figure 14:
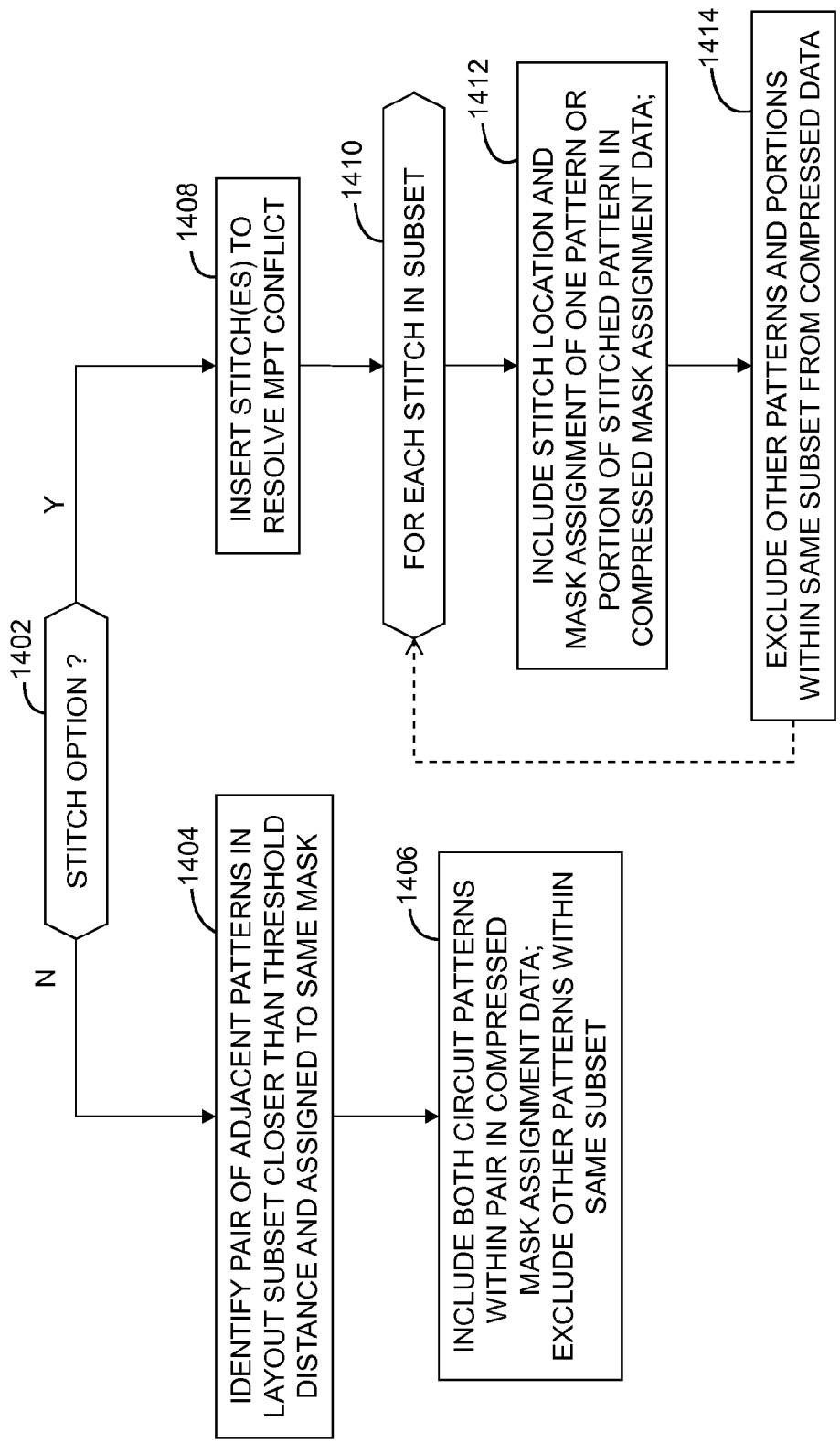
FIG. 14 is the flow chart for handling compression of mask assignment data if the layout contains MPT conflict(s).

At step 1106, a determination is made whether there are any MPT conflicts in the layer 100 of the layout. If there is an MPT conflict, the process of FIG. 14 is performed to resolve the conflict. If there is no conflict, step 1108 is performed next.

At step 1108, one pattern is selected within each independent layout subset. In some embodiments, the selection is random. For example, in FIG. 1C, the patterns numbered 3 and 10 in respective subsets 110 and 111 could be selected by at random. In other embodiments, a rule is used to select one circuit pattern in each subset 110, 111. For example, the rule can select the leftmost pattern, the rightmost pattern, the topmost pattern, or the bottommost pattern.

At step 1110, only the mask assignment of the respective single selected circuit pattern for each respective subset 110, 111 is included in the compressed mask assignment data. The remaining non-selected patterns are excluded from the compressed mask assignment data.

Thus, the number of mask assignments to be included in the stored/transmitted data is reduced from 10 to 2.

Figure 15:
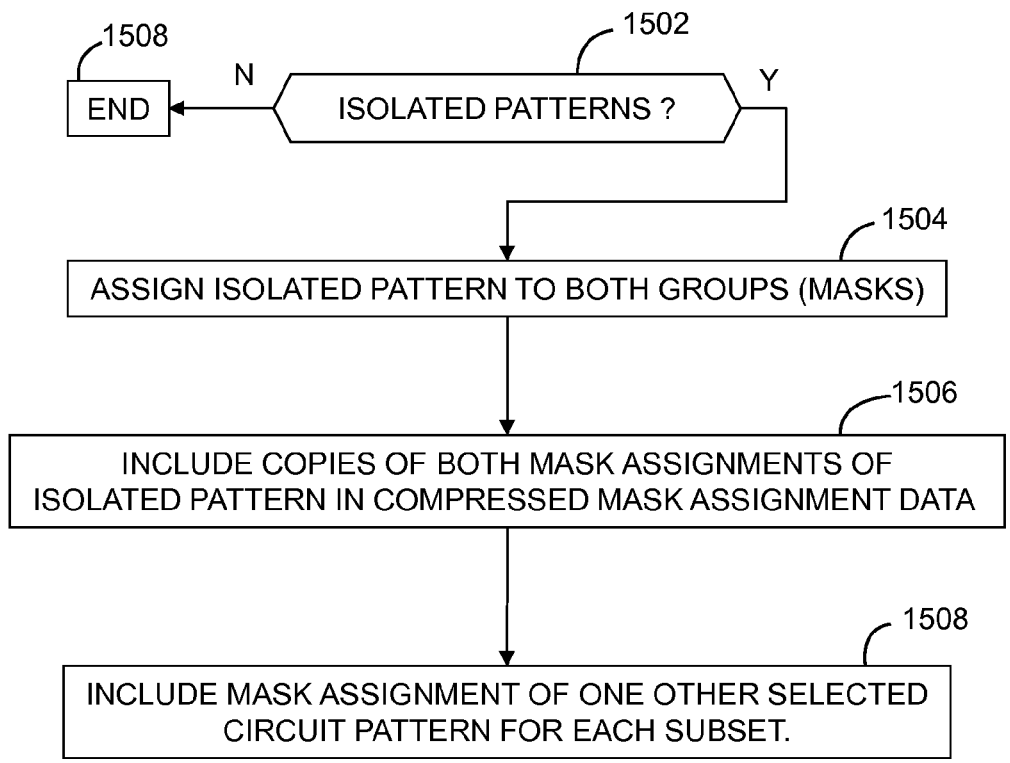
FIG. 15 is a flow chart for handling "overlapped" isolated patterns in the compression of mask assignment data.

At step 1112, a determination is made whether the layout of the layer further includes an isolated circuit pattern separated from all of the patterns in all of the independent layout subsets 110, 111 by at least the threshold distance G0. If there is an isolated pattern, the process of FIG. 15 is performed. If there is no isolated circuit pattern, then the compression process ends at step 1116.

Subsequently, during decompression, the mask (color) assignments of the selected circuit patterns are retrieved from the combined layout and compressed mask assignment data. For example, in the layout of FIG. 1C, the mask assignments of the patterns numbered 3 and 10 are retrieved. Then, following the same default assignment rule used during compression, the mask assignments of each remaining circuit pattern in each subset 110, 111 are generated. For example, if the mask assignment of each successive circuit pattern alternates, then patterns 2 and 4 are assigned to a different mask from pattern 3, and patterns 1 and 5 are assigned to the same mask as pattern 3. Similarly, patterns 7 and 9 are assigned to a different mask from pattern 10, and patterns 6 and 8 are assigned to the same mask as pattern 10.

Figure 2A:
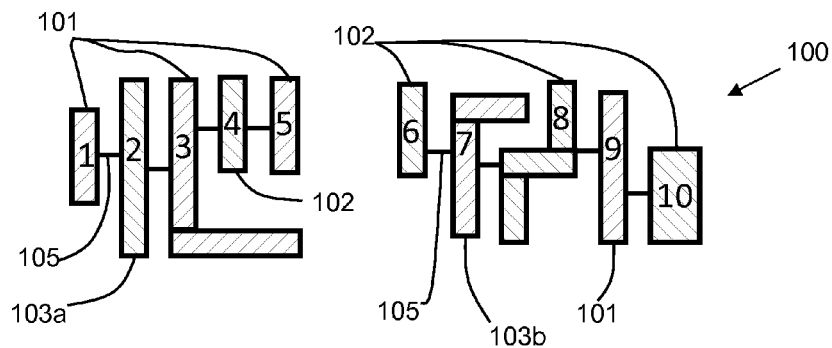
FIGS. 2A-2C show a circuit layout, its graph, and a further compressed mask assignment data representation for the layout, respectively.
Figure 2B:
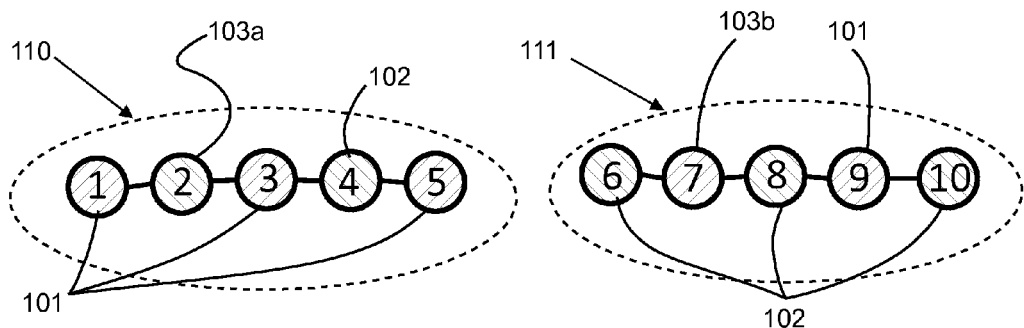
Figure 12:
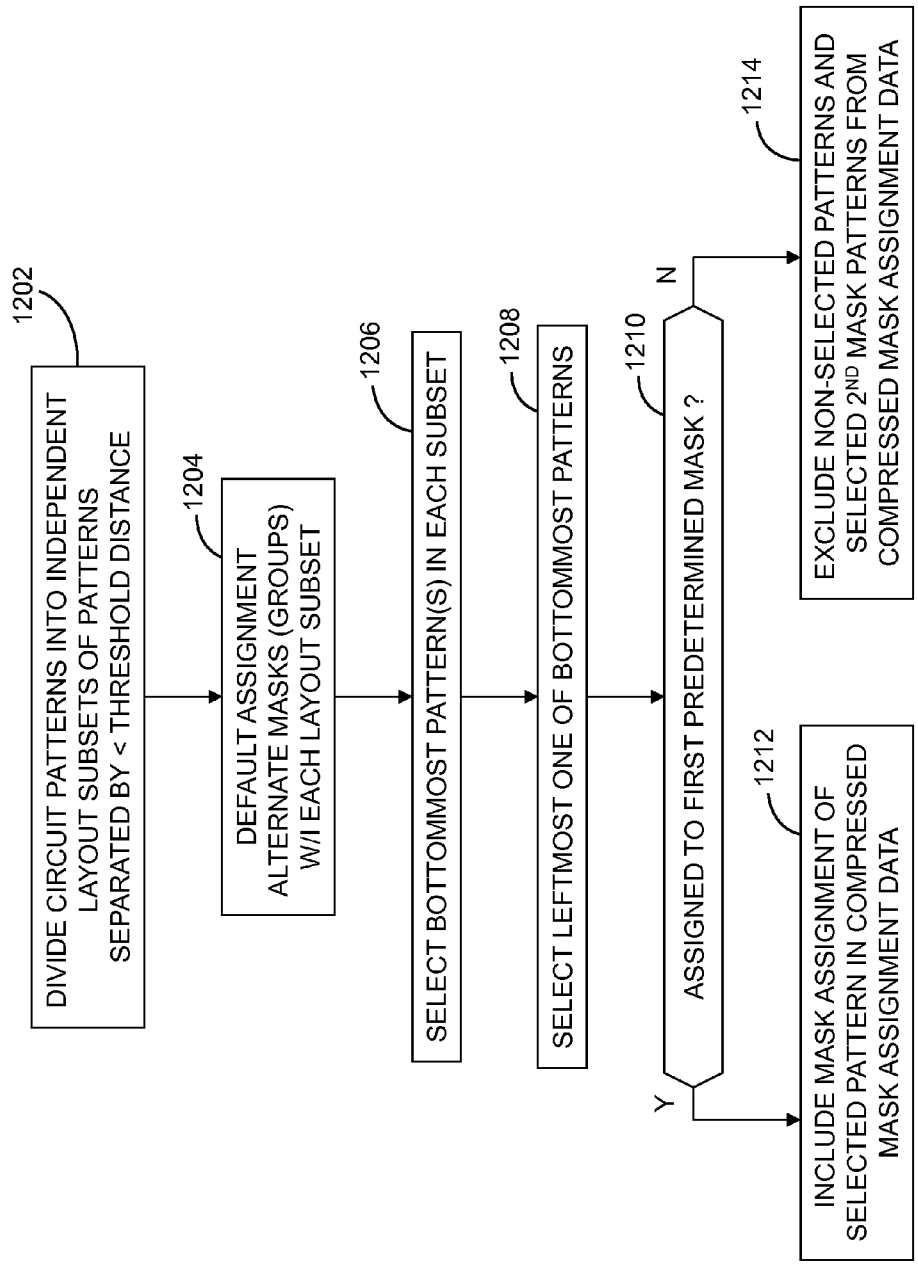
FIG. 12 is a flow chart of a variation of the mask assignment data compression algorithm of FIG. 11.

Reference is now made to FIGS. 2A-2C and 12. FIG. 12 is a flow chart of a method that provides a higher amount of compression. For ease of understanding, FIGS. 2A and 2B show the same circuit patterns as shown in FIGS. 1A and 1B.

At step 1202 of FIG. 12, the plurality of circuit patterns are divided into one or more independent layout subsets 110, 111, such that within each subset having two or more circuit patterns, each circuit pattern in that subset is separated by less than the threshold distance G0 from at least one other circuit pattern in that subset.

At step 1204, within each subset 110, 111, the default mask assignments alternate between the two masks (groups).

At step 1206, a rule is applied to select the circuit pattern at a predetermined location (relative to the other circuit patterns) to be included in the compressed mask assignment data. For example in step 1206, the bottom most pattern in each independent layout subset 110, 111 is selected. In the example, each subset 110, 111 has more than one circuit pattern with the same −Y coordinate. So a tie-breaking step is performed.

At step 1208, if there are more than one bottom-most pattern in one of the independent layout subsets 110, 111, then the leftmost one of the bottom-most patterns is selected. Although this example uses the bottom-left combination of criteria, other embodiments can use top-left, top-right or bottom-right criteria.

At step 1210, a determination is made whether each selected circuit pattern 103a, 103b is assigned to a first predetermined mask. For example, in one embodiment, the first predetermined mask is the mask represented by the light color in FIGS. 2B and 2C. The bottom-left circuit pattern 2 of subset 110 has this color (mask assignment), but the bottom-left pattern 7 of subset 111 does not have this color.

At step 1212, if the bottom-left pattern (e.g., pattern 2) has the first predetermined mask assignment, the compressed mask assignment data includes only the mask assignment of that respective single circuit pattern 2 for each one of the subsets having a closest circuit pattern to a predetermined location assigned to a predetermined one of the masks.

At step 1214, if the bottom-left pattern (e.g., pattern 7) does not have the first predetermined mask assignment, the compressed mask assignment data excludes the bottom-left pattern 7, and the non-selected patterns 6, 8-10 in that subset from the compressed mask assignment data.

Thus in this example, the number of mask assignments to be included in the compressed mask assignment data is reduced from 10 to 1.

Subsequently, during decompression, the mask (color) assignments of the selected circuit patterns are retrieved from the combined layout and compressed mask assignment data.

Figure 2C:
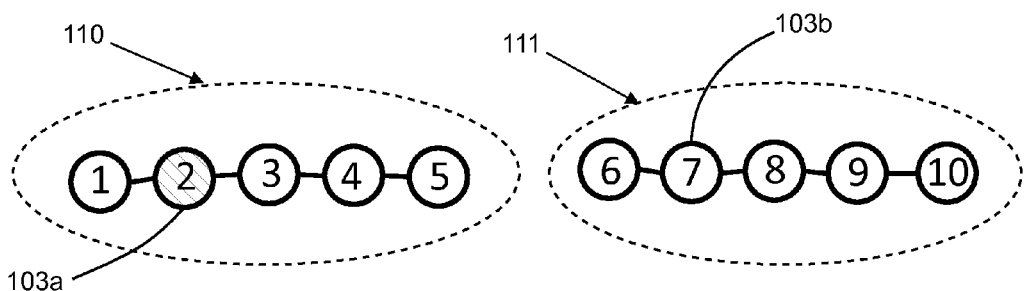

For example, in the layout of FIG. 2C, the mask assignments of the pattern numbered 2 is retrieved. There is no mask assignment for pattern 7 in the compressed data. Based on the rule used during compression, this implicitly identifies the color (mask assignment) of pattern 7 as being the dark color. Then, following the same default assignment rule used during compression, the mask assignments of each remaining circuit pattern in each subset 110, 111 are generated. For example, if the mask assignment of each successive circuit pattern alternates, then patterns 1, 3 and 5 are assigned to a different mask from pattern 2, and pattern 4 is assigned to the same mask as pattern 2. Similarly, patterns 6, 8 and 10 are assigned to a different mask from pattern 7, and pattern 9 is assigned to the same mask as pattern 7.

Figure 3A:
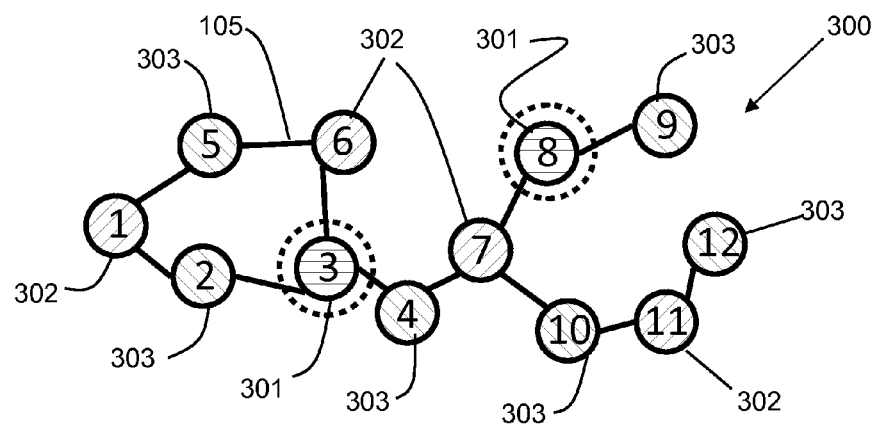
FIGS. 3A-3B show extension of the mask assignment data compression method to multi-patterning with more than two photomasks.
Figure 3B:
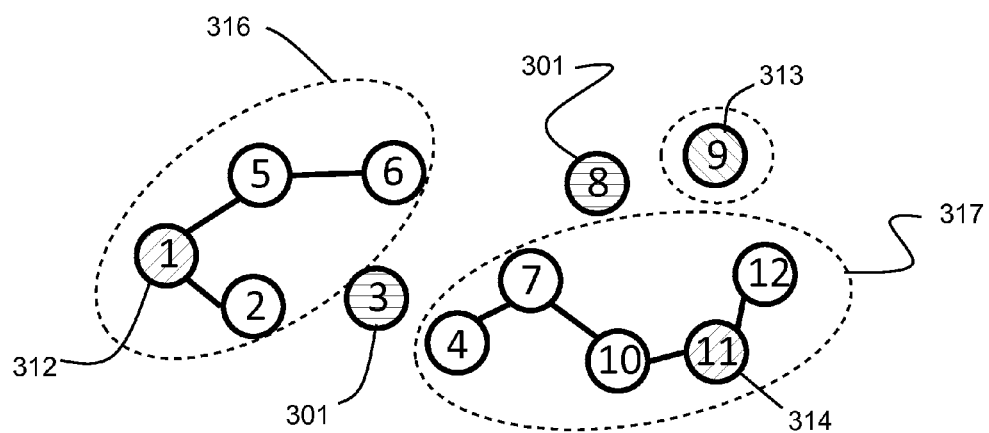
Figure 13:
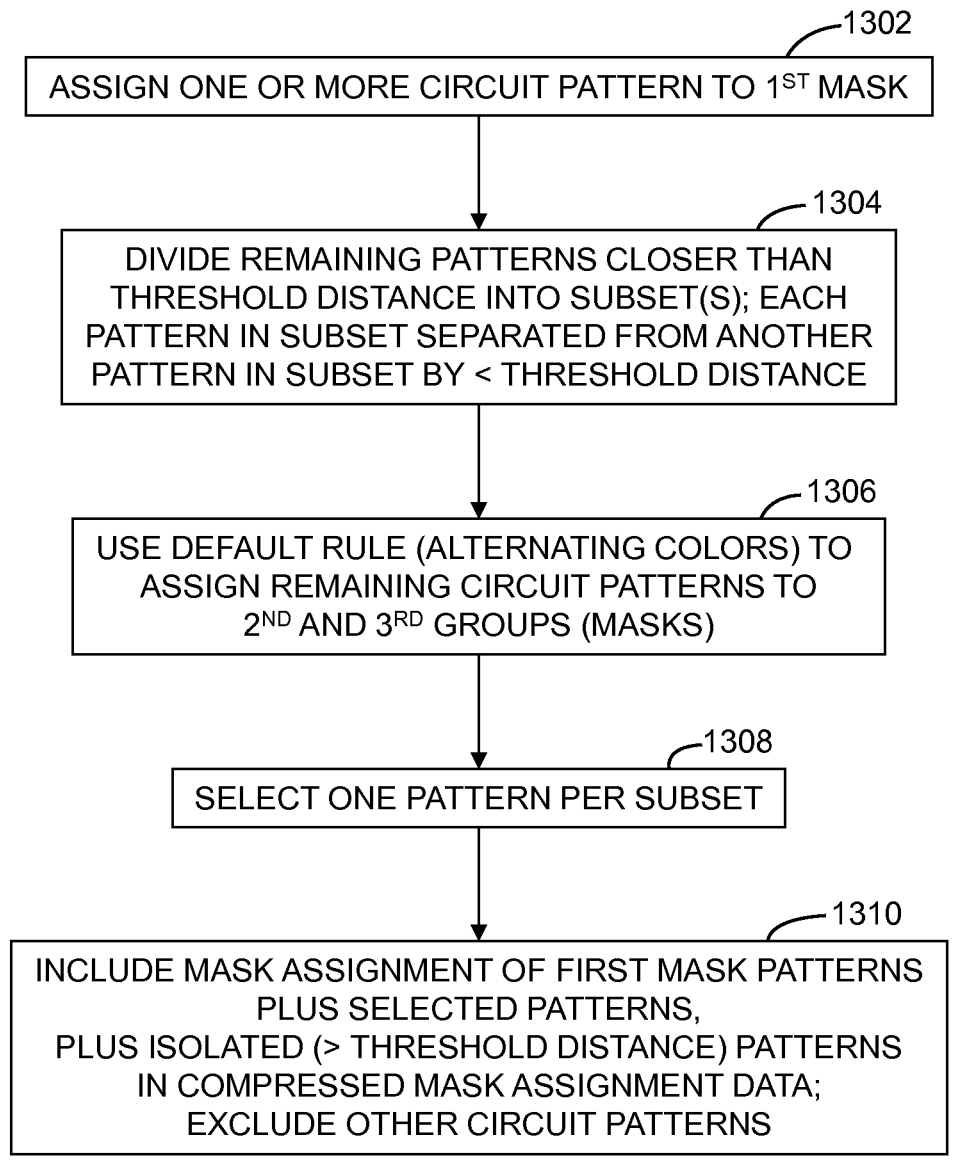
FIG. 13 is a flow chart of the mask assignment data compression algorithm for more than two photomasks.

Although the examples above are for DPT (only two masks), the method can be extended to MPT with any number of masks. FIGS. 3A, 3B and 13 show an example of mask data compression for triple patterning technology (TPT). As in the examples above, the connecting lines 105 indicate spacings between adjacent patterns smaller than the threshold distance G0.

At step 1302, one or more of the circuit patterns are assigned to a first one of the masks. In the example of FIG. 3A, the two patterns 301 are assigned to the first mask.

At step 1304, as shown in FIG. 3A, remaining ones of the plurality of circuit patterns 302, 303 separated by less than a threshold distance from at least one other remaining circuit pattern are divided into one or more subsets 316, 317, such that within each subset having two or more circuit patterns, each circuit pattern in that subset is separated by less than the threshold distance from at least one other circuit pattern in that subset. Having assigned patterns to the first mask, the assignment of the remaining patterns to the second and third mask can be handled the same way used to make DPT mask assignments. In the example, the patterns numbered 3 and 8 (which have been assigned to the first mask) are ignored during this step. The remaining patterns include a subset 316 having patterns 1, 2, 5, 6, a subset 317 having patterns 4, 7, 10, 11, 12, and an isolated pattern 313.

At step 1306, the second and third groups of circuit patterns are assigned to respective second and third masks to provide mask assignment data, for forming each group of circuit patterns on or in the single layer of the IC. For example, in FIG. 3A, the default method of assigning successive patterns to the second and third groups in alternating fashion is used to divide the remaining ones of the plurality of circuit patterns into second and third masks.

At step 1308, for each respective independent layout subset 316, 317, the mask assignment of a single one of the circuit patterns within that subset is selected for inclusion in the compressed mask assignment data. For example, in FIG. 3B, the patterns 312 in subset 316 and 314 in subset 317 are selected.

At step 1310, the compressed mask assignment data also includes the mask assignment of each circuit pattern assigned to the first mask and the mask assignment of each remaining circuit pattern separated by at least the threshold distance from each other remaining circuit pattern. The compressed mask assignment data also includes the mask assignments of each circuit pattern 301 assigned to the first mask, and the isolated pattern 313 separated by at least the threshold distance from each other remaining circuit pattern.

Figure 4A:
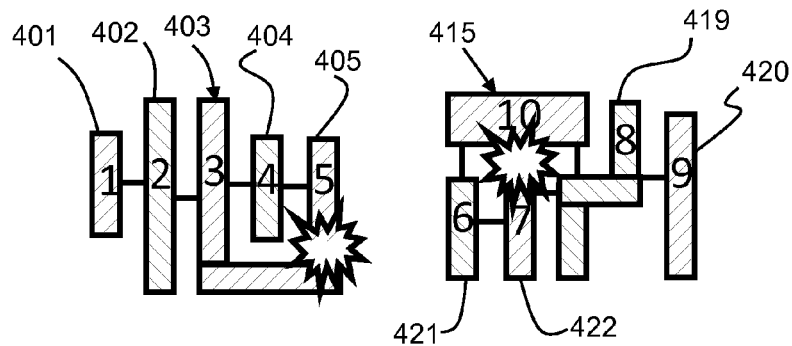
FIGS. 4A-4C show a circuit layout having MPT conflicts, a graph of the layout, and a representation of compressed mask assignment data for the layout, respectively.
Figure 4B:
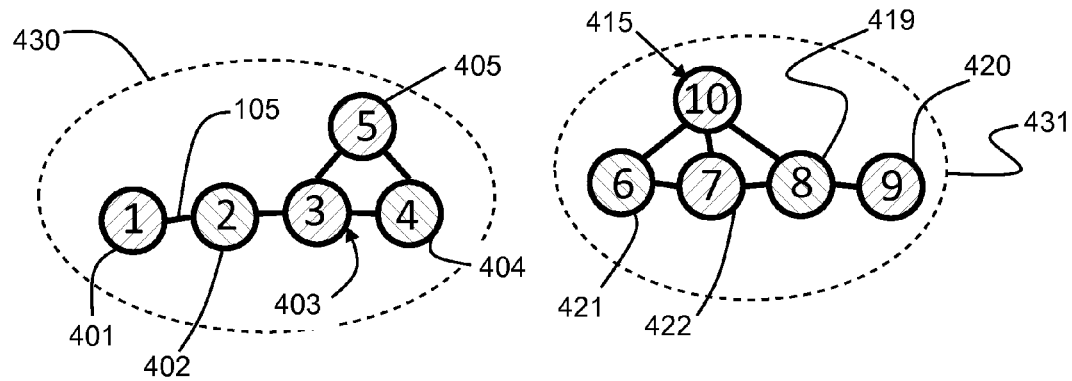
Figure 4C:
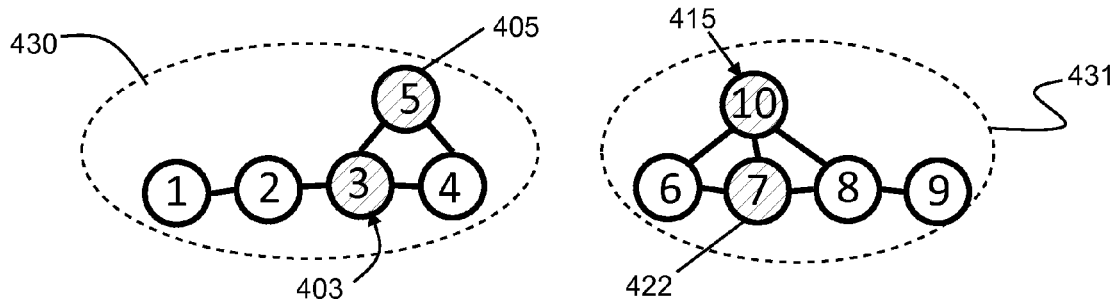
Figure 5A:
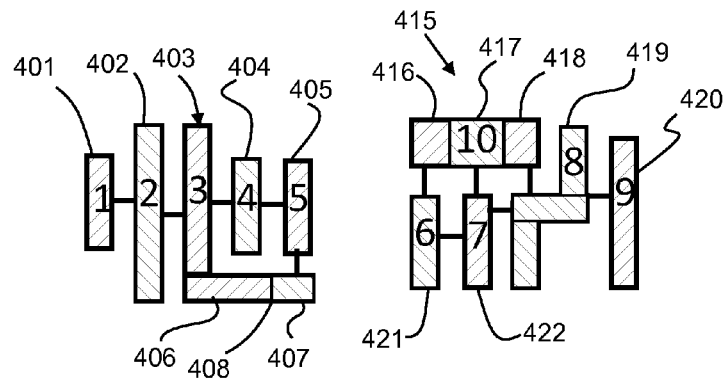
FIGS. 5A-5C show a circuit layout having stitches to resolve the MPT conflicts of FIG. 4A, a graph of the layout of FIG. 5A, and a representation of compressed mask assignment data for the layout, respectively.
Figure 5B:
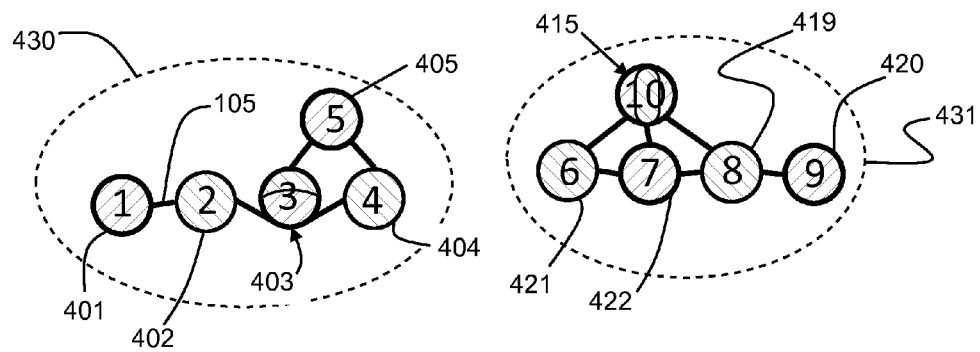

FIGS. 4A-4C, 5A-5C, and 14 show the handling of MPT conflicts. FIGS. 4A and 5A show two methods of handling the same layout. In FIGS. 4A and 5A, the plurality of circuit patterns includes three or more circuit patterns, each separated by less than a threshold distance from two or more other circuit patterns, such that the three circuit patterns have a multi-patterning conflict. In both cases, each layout includes a respective MPT conflict in each of the two independent layout subnets. In the left subnet, pattern 403 is closer than the threshold distance to both patterns 404 and 405. In the right subnet, pattern 415 is closer than the threshold distance to patterns 419, 421 and 422. Without revising the layout or inserting a stitch, patterns 403-405 cannot be formed clearly with two photomasks, and patterns 415, 419, 421 and 422 cannot be formed clearly with two photomasks.

At step 1402 of FIG. 14, a determination is made whether the stitch option is used. If the stitch option is not used, step 1404 is performed next. If the stitch option is to be used, step 1408 is performed next.

At step 1404, as shown in FIGS. 4B-4C, having used the default assignment of successive patterns to alternating masks (see the discussion of steps 1104, 1106 above), each group of patterns assigned to the same mask is examined separately. For example in FIG. 4A, one group includes patterns 401, 403, 405, 415, 422, and 420; The other group includes patterns 402, 404, 421, and 419. The method identifies a pair of adjacent patterns in the same group and layout subset closer to each other than the threshold distance G0 and assigned to the same mask. In this example, within group 1, patterns 403 and 405 are in the same mask and closer to each other than the threshold distance; and patterns 415 and 422 are in the same mask and closer to each other than the threshold distance.

FIG. 4B graphically shows the sub-threshold distance relationships 105 among the circuit patterns of FIG. 4A. The patterns 3, 4 and 5 form an odd-cycle loop, resulting in a DPT conflict. Similarly, the patterns 6, 7 and 10 form an odd-cycle loop, and the patterns 7, 8 and 10 form an odd cycle loop, also resulting in DPT conflicts.

At step 1406, the compression module 816 includes both the circuit patterns 403 and 405 from subset 430 and circuit patterns 415 and 422 from subset 431 in the compressed mask assignment data. This is shown graphically in FIG. 4B. Thus, the compressed mask assignment data for the plurality of circuit patterns include mask assignments for only two of the three or more circuit patterns. In the example of FIGS. 4A-4C, the mask assignment data for the layout shown is reduced by compression from 10 values to 4.

Subsequently, during decompression, the remaining circuit pattern mask assignments can all be regenerated by the receiving system (e.g., EDA tool) using the default rule, so that patterns 402, 404, 421 and 419 are assigned to a different mask than patterns 403, 405, 415 and 422; and patterns 401 and 420 are assigned to the same mask as patterns 403, 405, 415 and 422. Also, the presence of two adjacent mask assignment data (corresponding to patterns 403 and 405 in subset 430 and patterns 415 and 422 in subset 431) in the compressed mask assignment data is recognized by the tool during decompression as indicating an MPT conflict. The EDA tool can then notify the user (e.g., designer) that there is an MPT conflict. The designer can choose to solve the conflict by re-routing one or more patterns in the layout, or by inserting one or more stitches.

Referring again to FIG. 14, step 1408 is performed for a case where insertion of a stitch to resolve the MPT conflict is automated, or in which the user (e.g., designer) has already inserted a stitch before generating the compressed mask assignment data.

At step 1408, one or more stitch(es) is (are) inserted to resolve the MPT conflict.

FIG. 5A shows the layout of FIG. 4A, after insertion of a stitch 408 in pattern 403 and two stitches in pattern 415. Each stitch divides a circuit pattern into two or more adjacent portions with a small overlap (to ensure continuity in the event of a mask misalignment). For example, pattern 403 is divided into patterns 406 and 407. Pattern 415 is divided into patterns 416, 417 and 418. This is shown graphically in FIG. 5B, where the patterns 403 and 415 now have two and three colors, respectively, indicating plural portions assigned to respective masks.

Figure 5C:
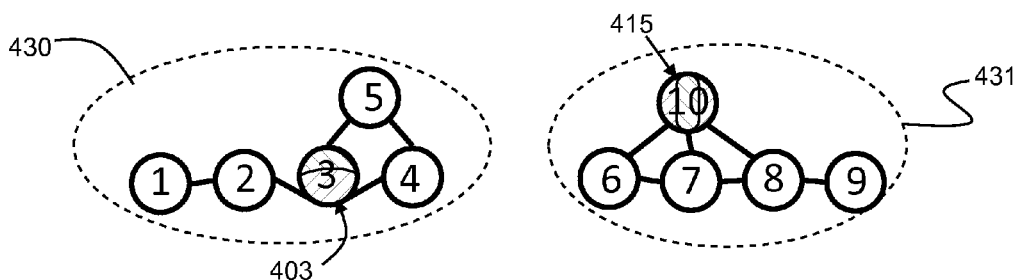

At step 1410, a loop including steps 1412 and 1414 is performed for each respective stitch, for each of the subsets including at least one circuit pattern having a stitch, with respective portions of each of the at least one circuit pattern on each side of the stitch assigned to a respectively different one of the masks, At step 1412, the compressed mask assignment data for the one subset only includes, for each circuit pattern having a stitch, a location of the stitch and a mask assignment of a single one of the circuit patterns in that subset or a single one of the portions of the circuit pattern having the stitch. Thus, as shown in FIG. 5C, pattern 403 in subset 430 and pattern 415 in subset 431 are included.

At step 1414, other patterns and portions of patterns within the same subset are excluded from the compressed data. As a result, the number of mask assignment values included in the compressed mask assignment data for the layout of FIG. 5A is reduced from 13 (wherein each portion of each stitched pattern has a separate mask assignment value) to 5.

Subsequently, during decompression, the default rule is used to regenerate the mask assignments of each circuit pattern or portion of a circuit pattern that is excluded from the compressed mask assignment data. Thus, based on the assignments of the portions 406, 407, 416, 417 and 418, the default rule will assign patterns 401 and 405 to the same mask as portion 406, and patterns 402 and 404 to a different mask. Similarly, the default rule will assign patterns 422 and 420 to the same mask as portion 416, and patterns 421 and 419 to a different mask.

FIGS. 6A-6C and 15 show the handling of isolated patterns in the layout separated by at least the threshold distance from any of the other patterns in any of the independent layout subsets (as discussed in step 1112 of FIG. 1).

Figure 6A:
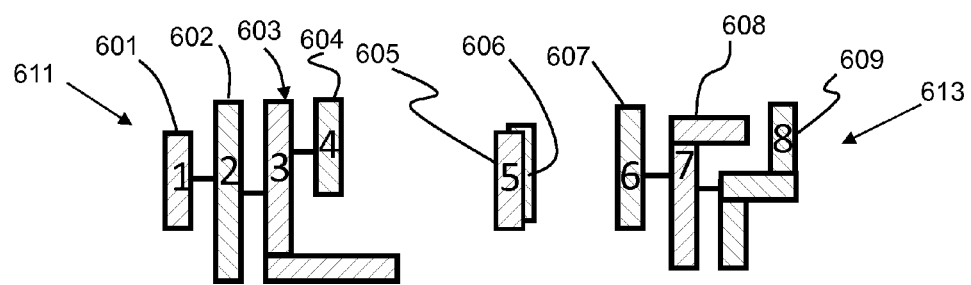
FIGS. 6A-6C show a circuit layout having an "overlapped" circuit pattern, a graph of the layout, and a representation of compressed mask assignment data for the layout, respectively.
Figure 6B:
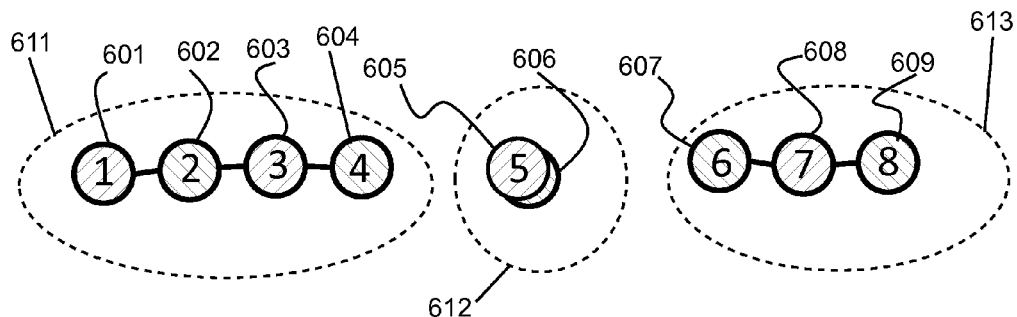

FIG. 6A shows an example in which the layout includes two independent layout subsets 611 and 613, and an isolated pattern (numbered 5). To improve the MPT processing, it is desirable for each photomask used to pattern the same layer to have approximately the same total circuit pattern area. In a situation where the subsets 611 and 613 have approximately equal total areas without consideration of pattern 5, the designer or foundry may choose to assign the pattern 5 to both masks as an "overlapped" pattern. This ensures that the total circuit pattern areas of the two masks will still be balanced after addition of the overlapped pattern. Thus, in FIG. 6A, pattern 5 is shown by a respective pattern 605 and 606 in each mask.

At step 1502, if an isolated pattern is identified, step 1504 is performed next. Otherwise, this process stops at step 1508.

At step 1504, the isolated circuit pattern separated by at least the threshold distance from each other remaining circuit pattern is identified as an overlapped pattern and is assigned to both groups of masks. As in the examples discussed above, the remaining ones of the plurality of circuit patterns are divided into one or more subsets 611, 613, such that within each subset having two or more patterns, each circuit pattern in that subset is separated by less than a threshold distance from at least one other circuit pattern in that subset.

Figure 6C:
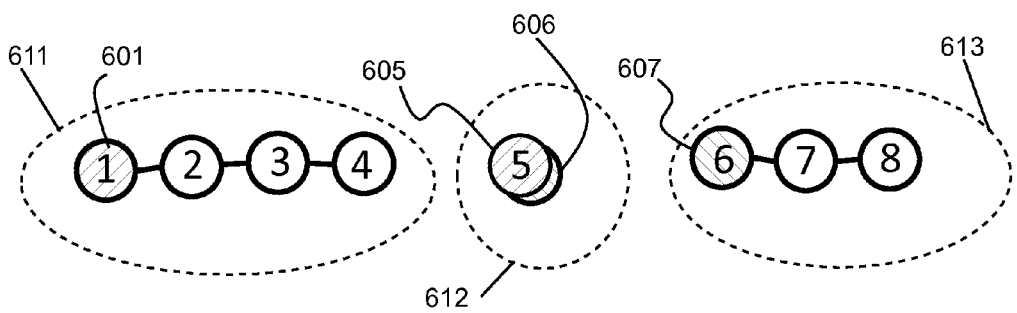

At step 1506, the compressed mask assignment data includes the mask assignment of the at least one circuit overlapped pattern in the compressed mask assignment data. In the example of FIG. 6C, the mask assignments 605 and 606 of pattern 5 are included in the compressed mask assignment data.

At step 1508 only one additional single circuit pattern per each respective subset is also included in the compressed mask assignment data. For example, in FIG. 6C, the mask assignments of patterns 601 and 607 are also included. The remaining patterns 2-4, 7-8 are excluded.

Figures 7A, 7B:
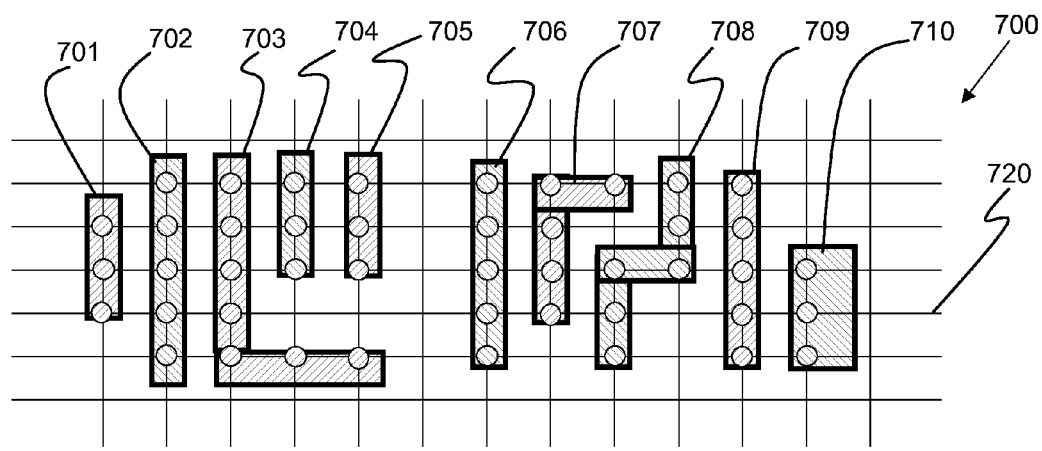
FIGS. 7A-7B show a grid representation of a layout, and a matrix containing the mask assignment data for the layout, respectively.
Figure 16:
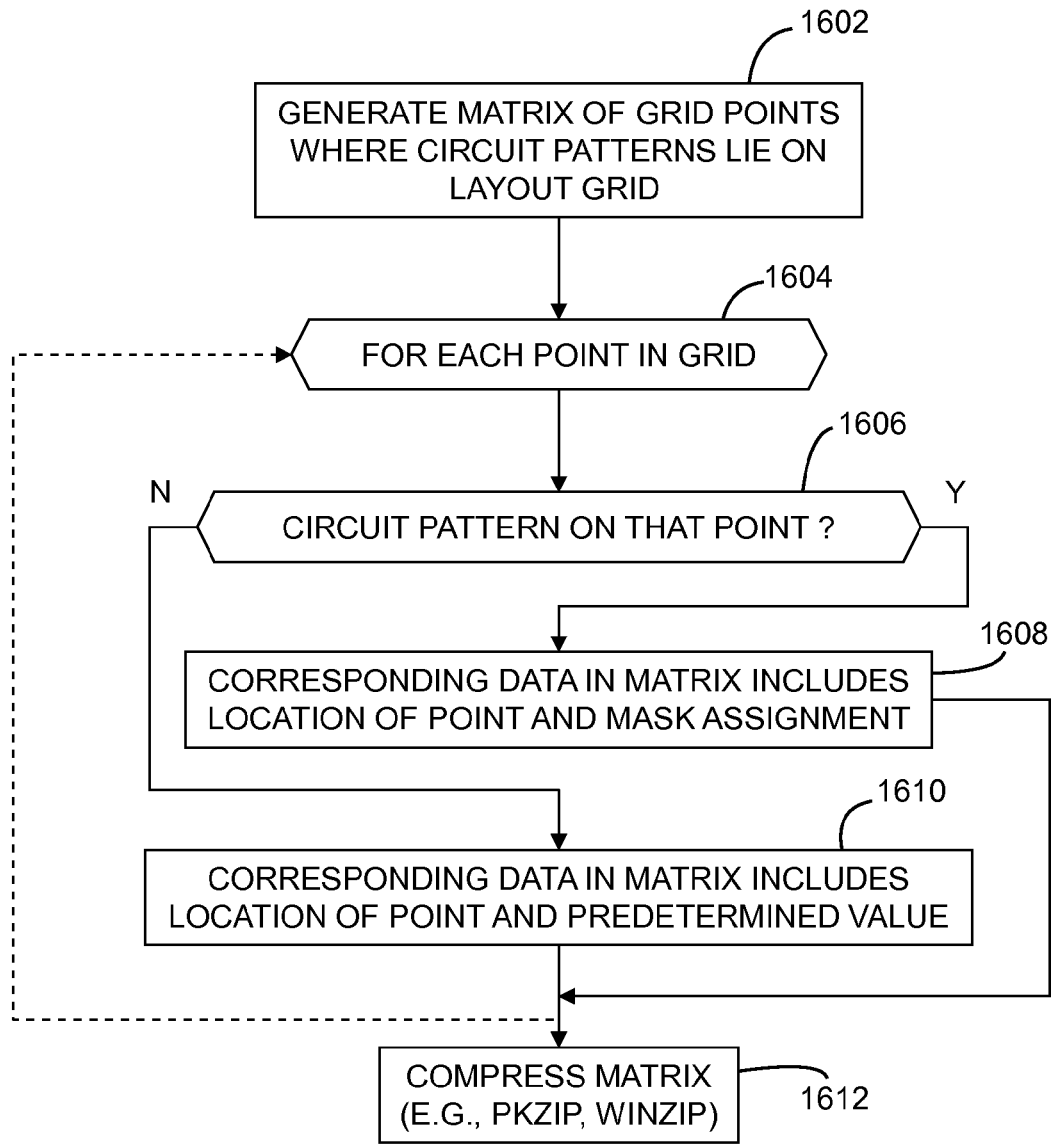
FIG. 16 is a method for compressing all of the mask assignment data in the layout.

FIGS. 7A, 7B and 16 show another embodiment. In this embodiment, the compressed mask assignment data includes explicit data describing the mask assignment of every circuit pattern 701-710, but the file containing the mask assignment data is compressed using a lossless compression algorithm. The method decompresses the compressed mask assignment data to provide a matrix of data pairs, each data pair including a location and an indicator, the indicator specifying whether any circuit pattern is located at that location, and if there is a circuit pattern at the location, the mask to which the circuit pattern is assigned.

At step 1602, the compressing step includes identifying points on a layout grid 720 at which each circuit pattern 701-710 lies. In FIG. 7A, the points are indicated as circles located at the intersection of the gridlines of grid 720. In FIG. 7A, the circuit patterns are shown in two colors, indicating that the patterns have been assigned to two photomasks, by assigning each successive pattern to a different mask from its neighbor. In layouts having MPT conflicts, the designer of foundry modifies one or more of the patterns or by inserting a stitch, as discussed in the examples above. A matrix of layout grid points is formed, including for each point a corresponding mask assignment datum if a circuit pattern lies at that point, or a predetermined value if no circuit pattern lies at that point.

FIG. 7B shows an example of a matrix 750 of grid points corresponding to the layout 700 of FIG. 7A. In this example, each grid point has a corresponding value in the matrix. For a DPT example (with two masks) there are three values, "0" corresponding to no pattern, "1" corresponding to light colored pattern formed on mask 1 and "2" corresponding to dark colored pattern formed on mask 2. If more than two masks are used, the number of available values for the grid points correspondingly increases. Thus, for patterning with N masks, there are N+1 values.

At step 1604, steps 1606-1610 are performed for each point in the grid.

At step 1606, a determination is made whether there is a pattern lying on that point. If there is a pattern, step 1608 is performed. If there is no pattern at that point, step 1610 is performed.

At step 1608, for the circuit pattern located at the given point, the corresponding data in the matrix includes the location of the point (e.g., ordinal position within the matrix), and the mask assignment. For example, in the matrix of FIG. 7B, the mask assignment value is "1" for the first mask, and the mask assignment value is "2" for the second mask.

At step 1610, if there is no circuit pattern located at the given point, the corresponding data in the matrix includes the location of the point, and a predetermined value. For example, in the matrix of FIG. 7B, the mask assignment value "0" at a given grid point indicates that there is no pattern at that point.

At step 1612, the matrix is compressed using a lossless algorithm. For example, the matrix can be compressed to a ZIP file using a program such as WINZIP or PKZIP.

Using the methods and systems described herein, the automated place and route tool and the sign-off MPT decomposition tools can efficiently exchange all coloring (mask assignment) data, even for large numbers of circuit patterns on a modern IC. This reduces the MPT coloring database exchanging cost, in terms of storage and/or telecommunications bandwidth. Using these techniques, in the event of an MPT conflict, decomposition results can be fed back to the routing tool more quickly. In various embodiments, the layout is partitioned into independent layout subsets. Only "key" colors are recorded in layout subsets, including (a) any one color, (b) stitch color, (c) conflict color, and/or (d) overlapped color. The tools can re-construct whole color database by building the sub-G0 space among patterns using graph traversal algorithms described above.

In some embodiments, a method comprises (a) providing an integrated circuit (IC) layout comprising data representing a plurality of circuit patterns to be formed on or in a single layer of an IC by multipatterning; (b) dividing the plurality of circuit patterns into two or more groups; (c) assigning the circuit patterns within each group to a respective mask to provide mask assignment data, for forming each group of circuit patterns on or in the single layer of the IC; (d) compressing the mask assignment data; and (e) storing the compressed mask assignment data to a non-transitory machine readable storage medium for use by an electronic design automation tool configured for reconstructing the mask assignment data from the compressed data.

In some embodiments, a method comprises: (a) retrieving data representing an integrated circuit (IC) layout and compressed mask assignment data from a non-transitory machine readable storage medium; (b) using an electronic design automation (EDA) tool to generate a complete set of mask assignment data from the compressed mask assignment data and the IC layout; (c) combining the layout data and the complete set of mask assignment data and storing the combined data in a non-transitory machine readable storage medium; and (d) performing an automated IC verification or IC mask fabrication process using the combined data.

In some embodiments, a system comprises a non-transitory, machine readable storage medium for storing an integrated circuit (IC) layout comprising data representing a plurality of circuit patterns to be formed on or in a single layer of an IC by multipatterning. An electronic design automation (EDA) tool is configured for: (a) dividing the plurality of circuit patterns into two or more groups; (b) assigning the circuit patterns within each group to a respective mask to provide mask assignment data, for forming each group of circuit patterns on or in the single layer of the IC; (c) compressing the mask assignment data; and (d) storing the compressed mask assignment data to the storage medium for reconstructing the mask assignment data from the compressed data.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method comprising:
providing an integrated circuit (IC) layout comprising data representing a plurality of circuit patterns to be formed on or in a single layer of an IC by multipatterning using at least two photomasks to pattern the single layer of the IC;
dividing the plurality of circuit patterns into two or more groups;
assigning the individual circuit patterns within each respective one of the two or more groups to a respective mask to provide mask assignment data identifying which of the at least two photomasks will be used to form each individual circuit pattern on or in the single layer of the IC, for forming each respective group of circuit patterns on or in the single layer of the IC;
compressing the mask assignment data by using a computer;
storing the compressed mask assignment data to a non-transitory machine readable storage medium for use by an electronic design automation tool configured for reconstructing the mask assignment data from the compressed data.

2. The method of claim 1, further comprising:
dividing the plurality of circuit patterns into one or more subsets, such that within each subset having two or more circuit patterns, each circuit pattern in that subset is separated by less than a threshold distance from at least one other circuit pattern in that subset,
wherein the compressed mask assignment data includes only the mask assignment of a respective single circuit pattern for each respective subset.

3. The method of claim 1, further comprising:
dividing the plurality of circuit patterns into one or more subsets, such that within each subset having two or more circuit patterns, each circuit pattern in that subset is separated by less than a threshold distance from at least one other circuit pattern in that subset,
wherein the compressed mask assignment data includes only the mask assignment of a respective single circuit pattern for each one of the subsets having a closest circuit pattern to a predetermined location assigned to a predetermined one of the masks.

4. The method of claim 1, wherein:
the plurality of circuit patterns are divided into three groups and the assigning step includes;
assigning one or more of the circuit patterns to a first one of the masks;
dividing remaining ones of the plurality of circuit patterns separated by less than a threshold distance from at least one other remaining circuit pattern into one or more subsets, such that within each subset having two or more circuit patterns, each circuit pattern in that subset is separated by less than the threshold distance from at least one other circuit pattern in that subset,
dividing the remaining ones of the plurality of circuit patterns into second and third groups; and
assigning the second and third groups of circuit patterns to respective second and third masks to provide mask assignment data, for forming each group of circuit patterns on or in the single layer of the IC, such that, for each respective subset, the compressed mask assignment data includes the mask assignment of a single one of the circuit patterns within that subset.

5. The method of claim 4, wherein the compressed mask assignment data further includes:
the mask assignment of each circuit pattern assigned to the first mask; and
the mask assignment of each remaining circuit pattern separated by at least the threshold distance from each other remaining circuit pattern.

6. The method of claim 1, wherein:
the plurality of circuit patterns includes three or more circuit patterns, each separated by less than a threshold distance from two or more other circuit patterns, such that the three circuit patterns have a multi-patterning conflict; and
the compressed mask assignment data for the plurality of circuit patterns include mask assignments for only two of the three or more circuit patterns.

7. The method of claim 1, further comprising:
dividing ones of the plurality of circuit patterns into one or more subsets, such that within each subset having two or more circuit patterns, each circuit pattern in that subset is separated by less than a threshold distance from at least one other circuit pattern in that subset, wherein one of the subsets includes at least one circuit pattern having a stitch, with respective portions of each of the at least one circuit pattern on each side of the stitch assigned to a respectively different one of the masks,
wherein the compressed mask assignment data for the one subset only includes, for each circuit pattern having a stitch, a location of the stitch and a mask assignment of a single one of the circuit patterns in that subset or a single one of the portions of the circuit pattern having the stitch.

8. The method of claim 1, wherein the method further comprises:
identifying at least one overlapped circuit pattern separated by at least the threshold distance from each other remaining circuit pattern;
dividing remaining ones of the plurality of circuit patterns into one or more subsets, such that within each subset having two or more patterns, each circuit pattern in that subset is separated by less than a threshold distance from at least one other circuit pattern in that subset,
the compressed mask assignment data includes the mask assignment of the at least one circuit overlapped pattern and only one other single circuit pattern for each respective subset.

9. The method of claim 1, wherein the compressing step includes:
identifying points on a layout grid at which each circuit pattern lies;
forming a matrix of the layout grid points, including for each point a corresponding mask assignment datum if a circuit pattern lies at that point, or a predetermined value if no circuit pattern lies at that point;
compressing the matrix.

10. The method of claim 9, wherein the step of compressing the matrix includes storing the compressed matrix in a ZIP format.

11. The method of claim 1, wherein the circuit patterns are divided into M groups, the method further comprising, before the compressing step:
(1) generating an MPT graph representing the plurality of circuit patterns, the graph having M colors, where M is an integer greater than 3;
(2) choosing one of the M colors;
(3) dividing the circuit patterns having the remaining ones of the M colors into sub-graphs;

(4) reducing M;
(5) repeating steps (2) to (4), until M=2.

12. A method comprising:
retrieving data representing an integrated circuit (IC) layout comprising a plurality of circuit patterns and compressed mask assignment data from a non-transitory machine readable storage medium;
using an electronic design automation (EDA) tool to generate a complete set of multipatterning mask assignment data from the compressed mask assignment data and the IC layout by using a computer, the complete set of multipatterning mask assignment data identifying which of at least two photomasks will be used to form each individual one of the plurality of circuit patterns on or in a single layer of the IC by multipatterning;
combining the layout data and the complete set of multipatterning mask assignment data and storing the combined data in a non-transitory machine readable storage medium; and
performing an automated IC verification or IC mask fabrication process using the combined data.

13. The method of claim 12, wherein:
the IC layout has a plurality of circuit patterns, the plurality of circuit patterns including one or more subsets, such that within each subset having two or more circuit patterns, each circuit pattern in that subset is separated by less than a threshold distance from at least one other circuit pattern in that subset, and
the compressed mask assignment data includes only the mask assignment of a respective single circuit pattern for each respective subset.

14. The method of claim 12, wherein:
the IC layout has a plurality of circuit patterns, the plurality of circuit patterns including one or more subsets, such that within each subset having two or more circuit patterns, each circuit pattern in that subset is separated by less than a threshold distance from at least one other circuit pattern in that subset, and
the compressed mask assignment data includes only the mask assignment of a respective single circuit pattern for each one of the subsets having a closest circuit pattern to a predetermined location assigned to a predetermined one of the masks.

15. The method of claim 12, wherein:
the IC layout has a plurality of circuit patterns, the plurality of circuit patterns including one or more subsets, such that within each subset having two or more circuit patterns, each circuit pattern in that subset is separated by less than a threshold distance from at least one other circuit pattern in that subset, and the plurality of circuit patterns are divided into three groups;
one or more of the circuit patterns are assigned to a first one of the masks;
remaining ones of the plurality of circuit patterns separated by less than a threshold distance from at least one other remaining circuit pattern are divided into one or more subsets, such that within each subset having two or more circuit patterns, each circuit pattern in that subset is separated by less than the threshold distance from at least one other circuit pattern in that subset,
the remaining ones of the plurality of circuit patterns being divided into second and third groups; and
the second and third groups of circuit patterns being assigned to respective second and third masks to provide mask assignment data, for forming each group of circuit patterns on or in the single layer of the IC, such that, for each respective subset, the compressed mask assignment data includes the mask assignment of a single one of the circuit patterns within that subset.

16. The method of claim 15, wherein the compressed mask assignment data further includes:
the mask assignment of each circuit pattern assigned to the first mask; and
the mask assignment of each remaining circuit pattern separated by at least the threshold distance from each other remaining circuit pattern.

17. The method of claim 12, wherein the step of using an electronic design automation (EDA) tool to generate a complete set of mask assignment data includes:
decompressing the compressed mask assignment data to provide a matrix or data pairs, each data pair including a location and an indicator, the indicator specifying whether any circuit pattern is located at that location, and if there is a circuit pattern at the location, the mask to which the circuit pattern is assigned.

18. A system comprising:
a non-transitory, machine readable storage medium for storing an integrated circuit (IC) layout comprising data representing a plurality of circuit patterns to be formed on or in a single layer of an IC by multipatterning using at least two photomasks to pattern the single layer of the IC; and
an electronic design automation (EDA) tool configured for:
dividing the plurality of circuit patterns into two or more groups;
assigning the individual circuit patterns within each respective one of the two or more groups to a respective mask to provide mask assignment data identifying which of the at least two photomasks will be used to form each individual circuit pattern on or in the single layer of the IC, for forming each respective group of circuit patterns on or in the single layer of the IC;
compressing the mask assignment data; and
storing the compressed mask assignment data to the storage medium for reconstructing the mask assignment data from the compressed data.

19. The system of claim 18, wherein the EDA tool is further configured for:
dividing the plurality of circuit patterns into one or more subsets, such that within each subset having two or more circuit patterns, each circuit pattern in that subset is separated by less than a threshold distance from at least one other circuit pattern in that subset,
wherein the compressed mask assignment data includes only the mask assignment of a respective single circuit pattern for each respective subset.

20. The system of claim 18, wherein the EDA tool is further configured for:
dividing the plurality of circuit patterns into one or more subsets, such that within each subset having two or more circuit patterns, each circuit pattern in that subset is separated by less than a threshold distance from at least one other circuit pattern in that subset,
wherein the compressed mask assignment data includes only the mask assignment of a respective single circuit pattern for each one of the subsets having a closest circuit pattern to a predetermined location assigned to a predetermined one of the masks.

21. The system of claim 18, wherein the EDA tool is further configured for:
the plurality of circuit patterns are divided into three groups and the assigning step includes;

assigning one or more of the circuit patterns to a first one of the masks;
dividing remaining ones of the plurality of circuit patterns separated by less than a threshold distance from at least one other remaining circuit pattern into one or more subsets, such that within each subset having two or more circuit patterns, each circuit pattern in that subset is separated by less than the threshold distance from at least one other circuit pattern in that subset,
dividing the remaining ones of the plurality of circuit patterns into second and third groups; and
assigning the second and third groups of circuit patterns to respective second and third masks to provide mask assignment data, for forming each group of circuit patterns on or in the single layer of the IC, such that, for each respective subset, the compressed mask assignment data includes the mask assignment of a single one of the circuit patterns within that subset.

* * * * *